United States Patent
Rossman

[11] Patent Number: 6,158,161
[45] Date of Patent: Dec. 12, 2000

[54] ROLLING FISHING LURE WITH PERFORATED PANEL CONSTRUCTION

[76] Inventor: David L. Rossman, 1421 E. Maplewood Ave., Bellingham, Wash. 98225

[21] Appl. No.: 09/298,013

[22] Filed: Apr. 22, 1999

Related U.S. Application Data

[60] Provisional application No. 60/082,664, Apr. 22, 1998.

[51] Int. Cl.⁷ .................................................. A01K 85/00
[52] U.S. Cl. ..................... 43/42.06; 43/42.21; 43/42.35; 43/42.48
[58] Field of Search ................. 42/42.06, 42.21, 42/42.35, 42.48

[56] References Cited

U.S. PATENT DOCUMENTS

| | | | |
|---|---|---|---|
| 1,913,362 | 6/1933 | Catarau | 43/42.06 |
| 2,008,004 | 7/1935 | Catarau | 43/42.06 |
| 2,215,772 | 9/1940 | Vecchia | 43/42.48 |
| 2,289,096 | 7/1942 | Brett | 43/42.21 |
| 2,774,174 | 12/1956 | Ganger | 43/42.06 |
| 2,835,999 | 5/1958 | Gillilan | 43/42.21 |
| 2,913,847 | 11/1959 | Ware | 43/42.06 |
| 2,937,467 | 5/1960 | Capps | 43/42.06 |
| 3,087,273 | 4/1963 | Nurme | 43/42.06 |
| 3,533,183 | 10/1970 | Treaster | 43/42.21 |
| 3,693,275 | 9/1972 | Craig | 43/42.06 |

*Primary Examiner*—Kurt Rowan
*Attorney, Agent, or Firm*—Todd N. Hathaway

[57] ABSTRACT

A fishing lure for enhanced attraction of game fish. The lure includes a plurality of panels, each of which is provided with a plurality of perforations which establish fluid communication between the interior of the body and the surrounding water. The body of the lure has a curvature which imparts a rolling motion as the lure is drawn through the water. The rolling motion simulates the swimming motion of a bait fish, and also forces water to pass into and through the perforations in the panels. This creates turbulence and vibrations which further simulate the characteristics of live bait fish. In a preferred embodiment, the curvature is established by joining the convex and concave edges of three crescentiform panels in edge to edge relationship around a hollow interior of the lure. The perforations may be in the form of mesh areas formed in one or more of the panels.

12 Claims, 4 Drawing Sheets

ROLLING FISHING LURE WITH PERFORATED PANEL CONSTRUCTION

This application claims benefit to Provisional Application No. 60/082,664 filed Apr. 22, 1998.

BACKGROUND OF THE INVENTION a. Field of the Invention

The present invention relates generally to fishing lures, and, more particularly, to a fishing lure which is constructed of at least one perforated panel and which rotates about an axis so as to create a turbulence and alternating visual effect which are attractive to predatory game fish.

b. Background Art

There are a large number of fishing lures designed to imitate bait fish. Many lures attempt to imitate the motions of an injured bait fish in one way or another, the most common types being spoons and plugs. Some such lures also seek to imitate the shape/appearance of a bait fish as closely as possible. There are also devices for attaching actual bait fish (whole or part) to a hook and line, in a manner which imparts a spiralling motion which somewhat resembles the swimming action of an injured fish.

Although the above devices have been shown to catch fish with varying degrees of success, they invariably exhibit deficiencies which limit their effectiveness. Game fish are able to perceive many of the physical attributes of their prey, largely by virtue of their lateral line organ, and hence any mismatch between physical characteristics of the lure and those of a natural bait fish may reduce the ability of the lure to produce the desired catch.

For example, many conventional lures are constructed with a solid body, such as a metal spoon or a plastic or wooden plug. Conventional lures thus tend to be either buoyant (like a wooden or plastic plug) or sinking (like a metal spoon), whereas the bodies of living bait fish and other aquatic prey generally have densities which are fairly close to that of the surrounding water. This disparity may negatively affect the ability of the lures to effectively mimic actual bait fish.

Furthermore, bait fish tend to produce a characteristic vibratory "signature" in the water, in the course of imparting force against the water with their fins and bodies. The outer surfaces of conventional spoons and plugs, however, are generally smooth or have only limited indentations or other features, and are consequently limited in their ability to generate the degree and quality of vibration/turbulence which is necessary to effectively imitate the signatures produced by bait fish.

Still further, while various forms of conventional spoons and plugs seek to imitate the swimming action of a bait fish by using a fluttering or wobbling action, the actual motion of a bait fish more typically sinuous in nature, and often follows a spiral path in the case of an sick or injured fish. Some lures do attempt to generate a sinuous/spiraling action, however, these tend to be inconsistent and unreliable in action, and generally require excessive tuning in order to operate properly.

Still further, swimming bait fish tend to generate a complex, flickering/shimmering visual display to which the predatory game fish respond. Conventional lures, however, such as spoon- or plug-type lures, are simply incapable of mimicking such a varied and complex display.

Accordingly there exists a need for a fishing lure having a density which more closely approximates that of an actual bait fish when immersed in water. Furthermore, there exists a need for such a lure which is able to generate turbulence and vibrations of a character and intensity which more closely correspond to those of live bait fish. Still further, there exists a need for such a lure which is able to generate a spiraling motion through the water which more closely resembles the swimming motion of a sick or wounded bait fish. Still further, there exists a need for such a lure which is able to generate a shimmering/flickering visual display which is also attractive to predatory fish.

SUMMARY OF THE INVENTION

The present invention has solved the problems cited above, and provides a lure having enhanced characteristics for attraction of game fish.

Broadly, this is a fishing lure comprising a plurality of panels which define a body of the lure, a plurality of perforations formed in at least one of the panels for establishing fluid communication between an interior of the body and the surrounding water, and means for imparting motion to the body of the lure in response to the lure being drawn through the water, so that the motion forces the water to pass through the perforations so as to generate turbulence and vibrations which attract game fish to the lure.

The plurality of panels may comprise a plurality of discrete panels joined in edge to edge relationship so as to define a 3-dimensional body having a hollow interior.

The perforations which are formed in at least one of the panels may comprise a mesh portion of the panel having a multiplicity of perforations formed therein. The mesh portion may comprise a mesh screen having a multiplicity of substantially rectangular perforations formed therein, and the substantially rectangular perforations may be oriented so as to extend generally diagonally relative to a longitudinal axis of the lure. Each of the plurality of panels forming the body may have the perforations formed therein.

The plurality of panels may be configured to form an elongate lure body having forward and rearward ends, and the means for imparting motion to the body of the lure may comprise at least a portion of the body having a curvature for causing the body to rotate in response to the lure being drawn through the water. Furthermore, the panels may have contrasting colored and/or reflective outer surfaces for generating a flickering visual effect in response to the motion of the lure.

The plurality of panels may comprise first, second and third substantially crescentiform panels, each crescentiform panel having a generally convex edge and a generally concave edge, the convex edge of the third panel being joined to the convex edge of the first panel, the concave edge of the first panel being joined to the convex edge of the second panel, and the concave edge of the second panel being joined to the concave edge of third panel, so that the crescentiform panels form the portion of the body having the curvature for causing the body to rotate as the lure is drawn through the water.

The lure may further comprise a leader attachment point formed on the body of the lure, the leader attachment point being located at a spaced distance from the forward end of the body. The leader attachment point may comprise an opening formed in a selected one of the panels so as to permit the leader to be threaded through the interior of the body to the rearward end thereof. The lure may further comprise means for attaching the hook at the rearward end of the body, and this may comprise an exit opening formed at the rearward end of the body for outward passage of the leader therethrough. The exit opening may also comprise a receptacle portion for receiving a barrel swivel which is attached to the leader, so as to hold the swivel in predetermined alignment with the body of the lure.

The panels may be formed as a unitary structure which forms the body of the lure, or the panels may be formed as at least first and second separate structures which are mounted together so as to form the body of the lure.

These and other features and advantages in the present invention will be apparent from a reading of the following detailed description in conjunction with the associated drawings.

DETAILED DESCRIPTION

Figure 1:
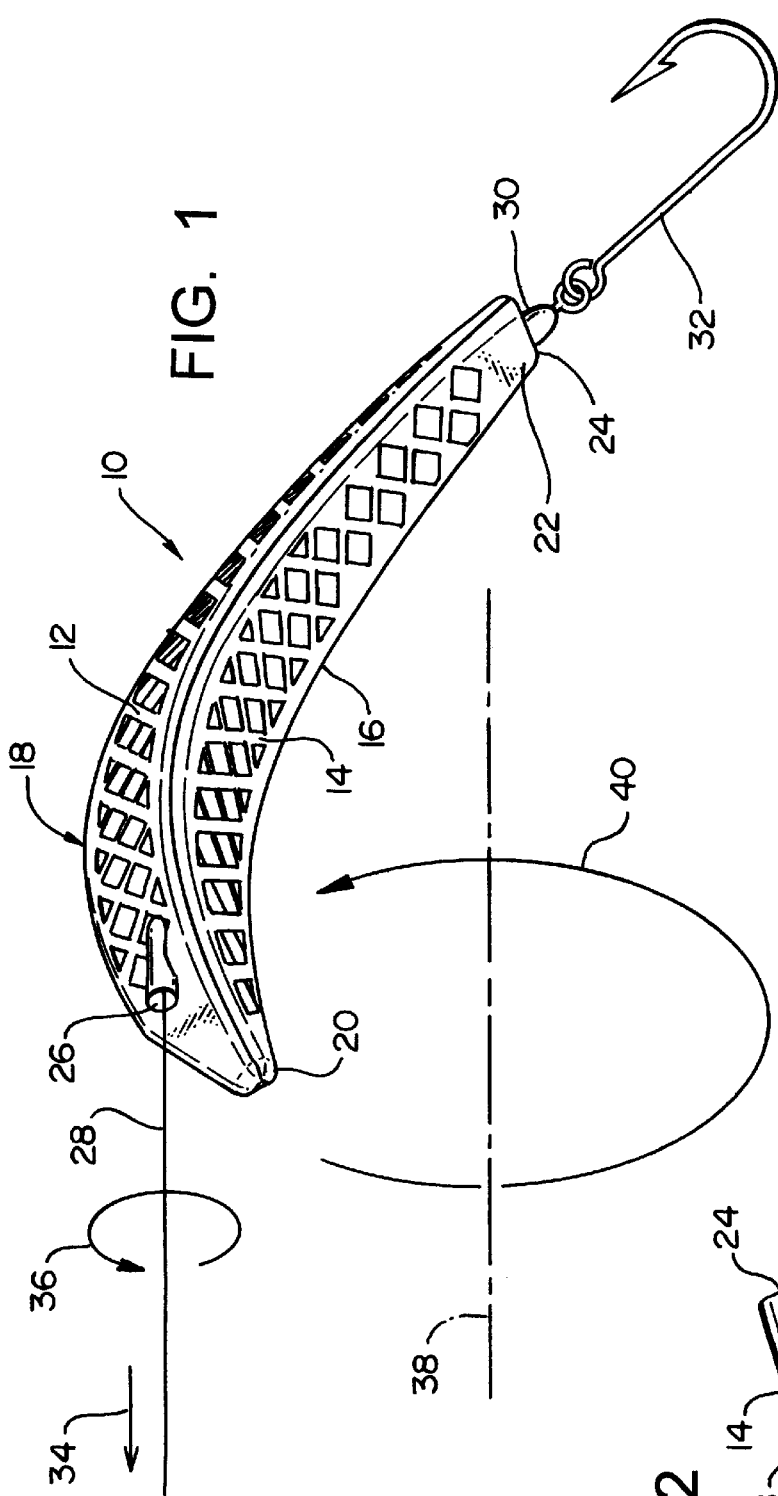
FIG. 1 is a perspective, environmental view of a lure in accordance with a first embodiment of the present invention, showing the perforated panels thereof and the rotation about primary and secondary axes which combine to impart a spiralling or rolling motion to the lure.

FIG. 1 shows a fishing lure 10 in accordance with the present invention. As can be seen, this includes three distinct panels 12, 14 and 16 which are joined along their edges to form a hollow, three-dimensional shell 18. This shell 18 has a generally arcuate, asymmetrical form with a somewhat pointed forward tip 20, and a rearward tip 22 which is truncated and terminates at a rearward receptacle 24.

As can also be seen in FIG. 1, at least one of the panels of the lure is formed with a mesh portion or otherwise provided with a multiplicity of perforations which establish fluid communication between the interior of the lure and the surrounding water. In the embodiment which is shown in FIG. 1, all three of the panels 12, 14 and 16 are provided with such perforations. As will be described in greater detail below, the perforations serve to generate the desired vibrations and turbulence, and also ensure proper density of the lure while in use.

A leader opening 26 is provided in the forward end of the lure, this being is offset a short distance from the forward tip of the shell 18. A section of leader or other fishing line 28 passes through the opening and the interior of the shell, and emerges rearwardly through receptacle 24. The tail end of the line is attached to a conventional swivel 30, which in turn is attached to a conventional fish hook 32. The forward end of leader 28, in turn, is preferably attached to a main fishing line by a second swivel (not shown), so as to inhibit twisting of the main line due to the spiralling action of the lure.

The leader is preferably allowed to slide freely through shell 18 when in use, so that swivel 30 is drawn partway into receptacle 24 by the tension on the leader. The receptacle holds the swivel in the proper orientation relative to shell 18, thereby ensuring free action of the lure 10 relative to hook 32; if the hook were not able to rotate freely relative to the shell, the hook would act somewhat in the manner of a keel and would impair or inhibit the rolling action of the lure.

In some embodiments a wire shaft with eyelets at its ends may be used to attach the leader and swivel/hook at the front and rear of the lure, rather than the leader being threaded through the interior of the lure body 18 as shown in FIG. 1. In other embodiments, the line 28 may extend through a length of plastic tubing which is mounted inside the hollow body of the lure. In still other embodiments the leader and the swivel/hook may be attached to the lure by means of eyelets which are mounted or anchored directly to the shell itself.

Figure 2:
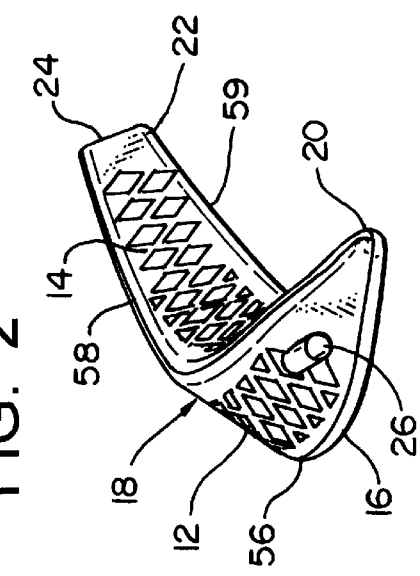
FIG. 2 is an elevational view of the forward end of the lure of FIG. 1, showing the curvature of the lure in greater detail and also showing the offset between the tip of the lure and the forward end of the leader passage which extends into the body of the lure.

As will be described in greater detail below, the construction of the lure 10 provides each of the panels with a somewhat different curvature; for example, in the preferred embodiment which is shown in FIGS. 1-2, one panel is slightly convex, the second strongly convex, and the last strongly concave. The forward leader opening 26 is preferably formed in the strongly convex panel, at a spaced distance from the forward tip of the shell, and forms an effective attachment point between the leader and the lure. The opening is suitably located approximately midway between the forward tip of the lure and a line drawn across the panel at its point of maximum curvature; for example, for a 3 ½ inch long lure having the configuration which is shown in the figures, this may be at a location approximately ½ inch rearwardly of the tip of the lure.

Consequently, as the lure is drawn through the water in the direction indicated by arrow 34 in FIG. 1, the curved shape of the lure causes it to rotate about the axis of the leader 28 as indicated by arrow 36, and to also rotate about a remote axis 38 as indicated by arrow 40. The combination of these motions causes the lure to travel along a generally spiral path, resembling the overall swimming motion of a sick or wounded bait fish, while simultaneously displaying the three panels 12, 14 and 16 in rapid succession. The three distinct panels thus enable the lure of the present invention to display a greater and more rapidly changing variety of contrasting surfaces than the conventional spoons and plugs mentioned above. For example two of the sides can be black and white, to create a strong "on-off" visual effect, while the third side can be a natural or "attractor" color, such as green, red, purple or yellow. Also, one or more of the sides can be formed with a reflective, fluorescent or luminescent surface.

Changing the position of the leader opening in the shell alters the rate at which the lure rotates at a given speed through the water, and also changes the orientation and action of the lure as it travels along its spiral path. For example, in most instances it is preferable for the tail end of the lure to follow in a straight path behind the tip. Moving the leader attachment point further away from the tip slows the rate of roll and also increases the diameter of the spiral path; this will also tend to impose a "tail-in" aspect or pitch to the lure, i.e., the tail will tend to follow a tighter spiral than the head. Moving the attachment point towards the tip has the reverse effect. Also, moving the attachment point laterally between the edges of the panel tends to change the orientation/pitch of the lure without changing the overall diameter of the path. In some embodiments, multiple leader openings/attachment points may be provided to permit selective adjustment of the action and pitch of the lure. Moreover, in other embodiments there may be a sliding, pivoting or rotating attachment point which will permit such an adjustment; for example, the leader opening may be formed as an offset bore in a disk which is rotatably mounted to the body of the lure, so as to allow the position of the bore to be adjusted by turning or rotating the disk.

In addition to simulating a swimming action, the spiralling or rolling motion of the lure also forces water to enter and pass through the mesh or other perforations in the side panels. As this is done, the multiple surfaces and flow channels created by the perforations cause turbulence to develop in the water, generating vibrations for attracting the game fish.

In the preferred embodiment which is shown in FIGS. 1–2, the perforations cover substantially the entirety of each panel and are oriented diagonally to the longitudinal centerline of the lure; suitable dimensions for the perforations in this embodiment are about 0.09 inches square, spaced 0.14 inches on center in two directions, although these dimensions may vary depending on the size of the lure, the target game fish species, and other factors. Also, while the perforations shown in FIGS. 1–2 are generally rectangular or square, in other embodiments the perforations may be circular, oval, polygonal, or have any other suitable shape which generates the desired turbulence/vibrations. Furthermore, different sizes and/or shapes of mesh or perforations may be combined in a single lure to provide a broader range of turbulence patterns and frequencies.

In addition to the perforations, the comparatively "sharp" edges along which the three distinct panels are joined create additional vibrations/turbulence, generally at somewhat lower frequencies. This augments the vibrations which are generated by the perforations, so as to produce an overall vibratory "signature" which more closely approximates that of natural bait fish.

As well as producing the desired turbulence vibrations, the perforations in the mesh panels also ensure flow of water into the interior of the lure, thereby ensuring that the lure has a density similar to that of water when in use. Furthermore, the mesh panels also avoid the creation of a hard, impenetrable boundary or "wall" between the interior of the lure and the surrounding water, which a game fish might otherwise perceive as being unlike the body of a bait fish.

Figure 3A:
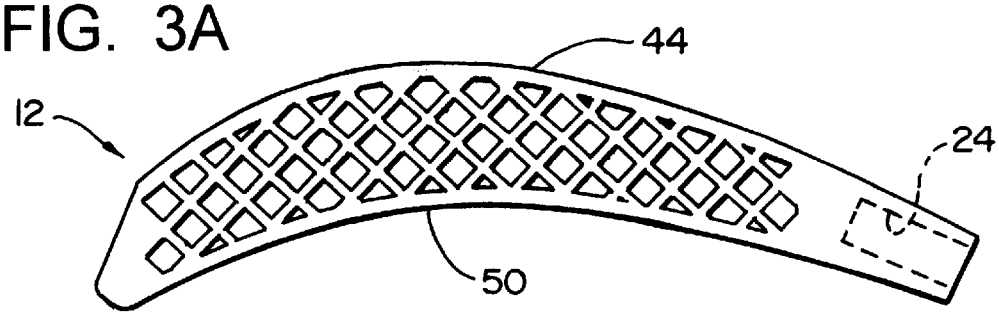
FIGS. 3A–3C are a series of plan views showing the configurations of the three crescentiform panels which form the lure of FIGS. 1–2, and also showing the edges along which the panels are joined to form the three-dimensional body of the lure.
Figure 3B:
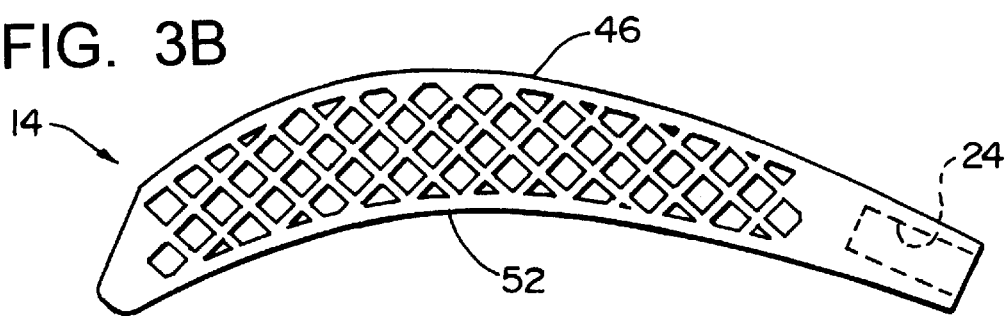
Figure 3C:
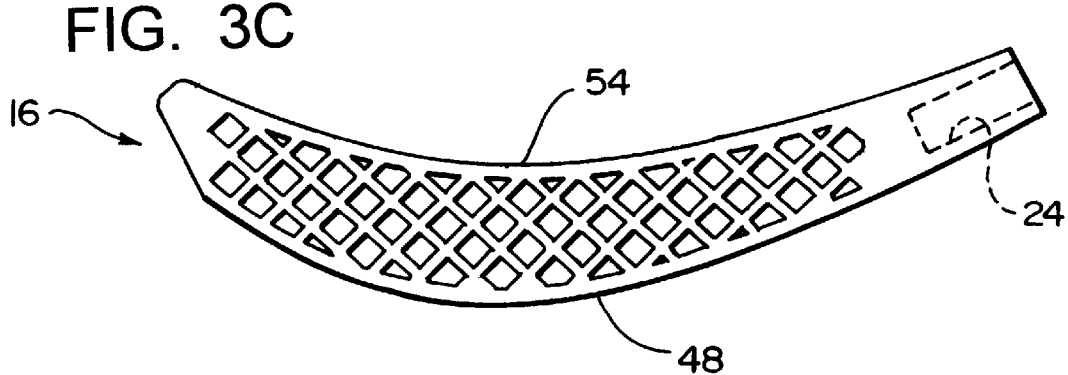

FIGS. 3A–3C show exemplary shapes for the panels 12, 14 and 16 which form the shell of the lure. The outside surfaces of panels 12, 14 and 16 are shown with the panels laid out flat. While FIGS. 3A–3C show the three panels separately, these may be formed in a single body, as by injection molding, for example.

As can be seen, all three panels may be identical in shape, which produces a highly satisfactory action, although it will be understood that in some embodiments the shapes of the panels may vary somewhat from one to another. Each panel is generally crescentiform in shape and has a first, convex edge (44,46,48) and a second, concave edge (50,52,54). In order to form the shell of the lure having the shape which is shown in FIGS. 1–2, the convex edge 48 of panel 16 is joined to the convex edge 44 of panel 12 so as to form a first lengthwise edge 56. The concave edge 50 of panel 12 is then joined with the convex edge 46 of panel 14 to form second edge 58, and the concave edge 52 of panel 14 is joined with the concave edge 54 of panel 16 to form the final edge 59.

The body of the lure may be formed of any suitable material, although a material having a good corrosion resistance and durability, as well as a relatively neutral buoyancy in water, is generally preferred. In particular, molded plastic is eminently suitable for use in the construction of the present invention, such as molded crystal styrene, polycarbonate or polyethylene material, for example. Moreover, the body of the lure may be formed as a single unit, or this may be built up from a plurality of components, such as two or more panels units which are molded or formed separately and then joined together to form the three-dimensional shell.

For example, FIGS. 4–7 show a lure body in accordance with the present invention which is assembled by joining two separately molded units, which has certain advantages in terms of simplicity of molding and economy of manufacture.

Figure 4:
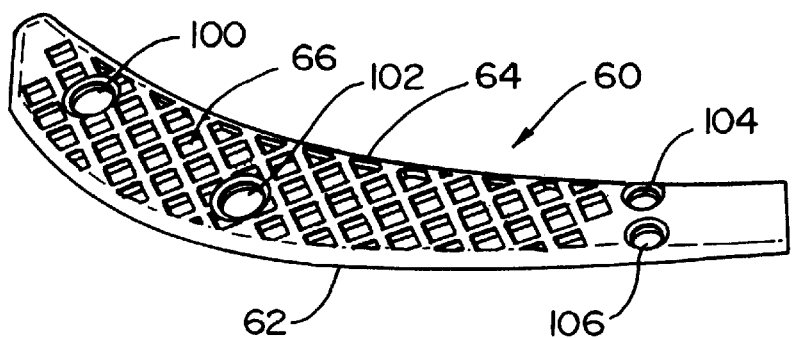
FIGS. 4 and 5 are top, perspective views of upper and lower sections of a lure constructed in accordance with a second embodiment of the present invention, the upper section having a mesh panel and the lower section having second and third panels which are joined to form a generally V-shaped lower structure.
Figure 5:
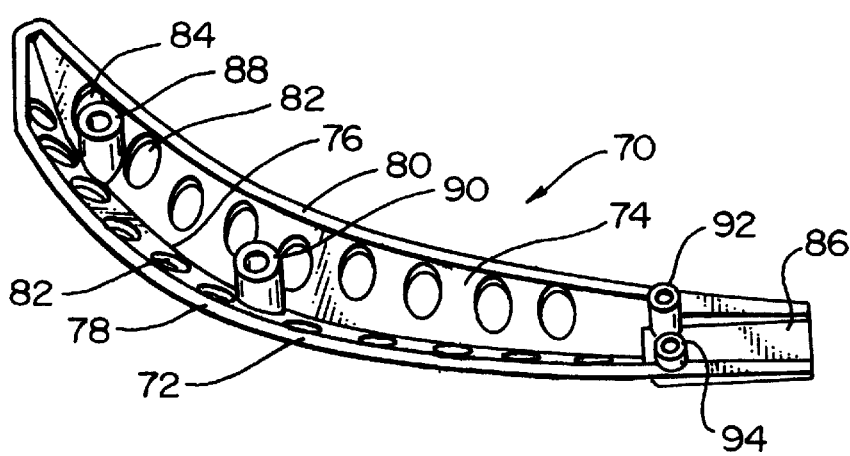

In particular, as can be seen in FIGS. 4–5, the shell is molded in upper and lower sections 60, 70. The upper section 60 corresponds to one of the perforated panels (e.g., panel 16) described above, this having a crescentiform shape defined by convex and concave edges 62, 64 and a mesh area 66 with a multiplicity of small, generally square perforations. The lower section 70, in turn, is a generally V-shaped structure in which there are two panels 72, 74 which correspond to the remaining panels of the lure (e.g., panels 12 and 14); these are joined along a common bottom edge 76 (see also FIG. 7) and have upwardly disposed edges 78 and 80 which correspond to the edges 62, 64 of the upper section 60.

In the embodiment which is illustrated in FIGS. 4–7, the panels of the lower section 70 are provided with a series of generally circular perforations 82 which are oriented in a common, generally vertical direction. This arrangement provides certain advantages in terms of ease of molding, although it will be understood that in other embodiments the perforations may have the square mesh configuration described above; conversely, all of the panels may be formed with circular perforations similar to those shown in lower section 70. The lower section 70 also incorporates a leader opening 84 near its forward tip, which corresponds to the leader opening 26 described above, and a rearward receptacle 86 which corresponds to receptacle 24.

In addition, as can be seen in FIG. 5, the V-shaped lower section 70 includes a plurality of vertically extending posts 88, 90, 92 and 94. These project above the plane of edges 80, 78, and are configured to be received in corresponding openings 100, 102, 104 and 106 in the upper section 60.

Figure 6:
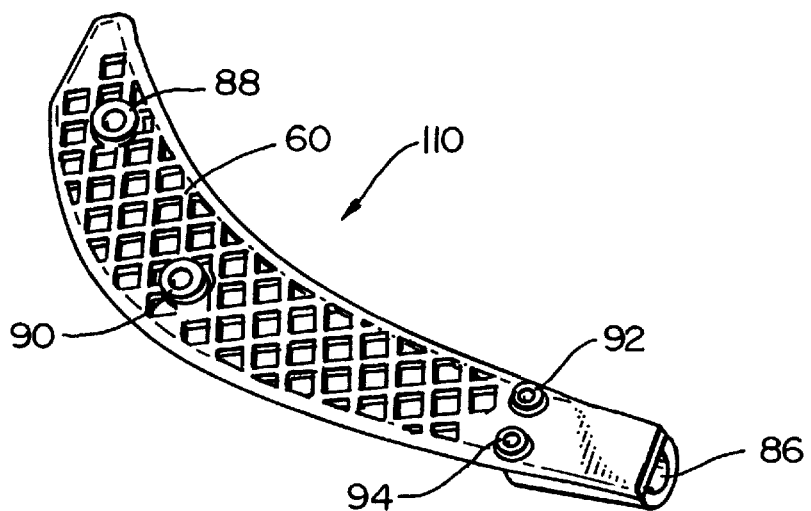
FIGS. 6 and 7 are top and bottom perspective views of the three-dimensional body of a lure constructed by joining the upper and lower sections which are shown in FIGS. 4–5.
Figure 7:
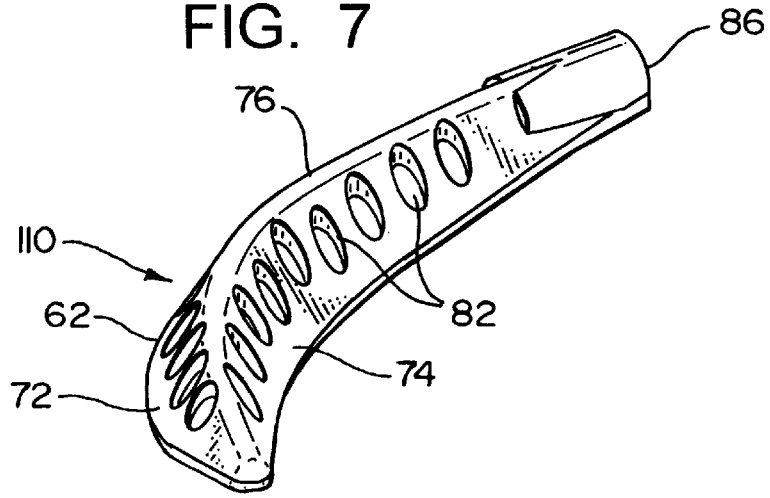
Figure 8:
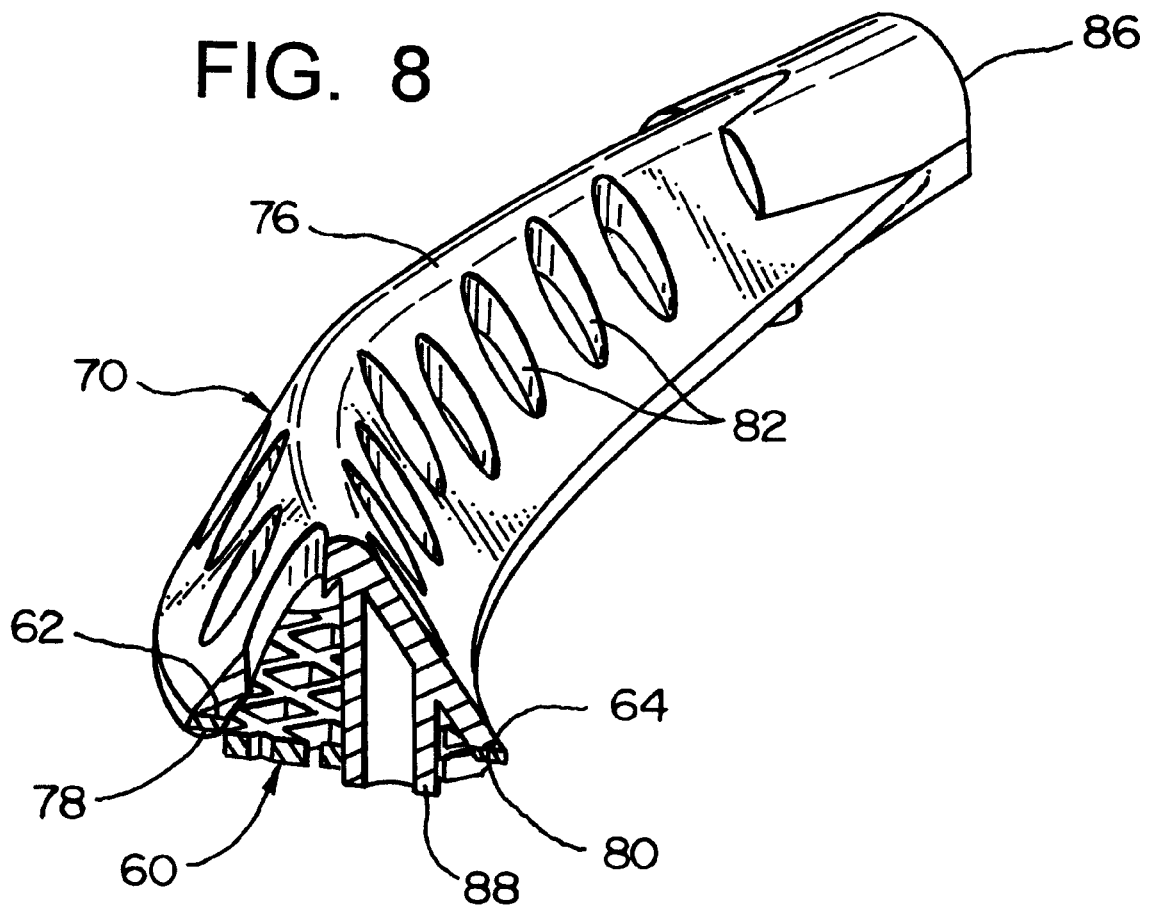
FIG. 8 is an end, perspective view of the lure of FIGS. 6–7, partially in cross-section, showing the manner in which the V-shaped lower structure abuts and is joined to the upper panel of the assembly.

Thus, to assemble the lure the upper and lower sections are aligned, and the posts 88, 90, 92, 94 are inserted into openings 100, 102, 104, 106 to join the two sections in a single body 110, as shown in FIGS. 6–7. This brings the convex and concave edges 62, 78 and 64, 80 of the upper and lower sections into abutment as shown in FIG. 8. The ends of the posts are then bonded to the openings in a suitable manner. For example, the posts can be bonded to the openings using a suitable adhesive, or the posts can be deformed mechanically or thermally to form a rivet-type fastening. The posts can also be joined to the openings using a barb, snap or interference fit, and in some embodiments the posts/openings may be selectively detachable to provide access to the interior of the lure.

It is to be understood that the shape described above may be used to generate the desired spiralling or rolling action in lures which are formed of solid materials, such as plastics, wood, processed organic materials, or other materials which lack the hollow structure or the perforated panel construction which have been shown herein. By the same token, it will be understood that the perforated panel construction provided by the present invention may be used to advantage in lures having other shapes and motions/actions. For example, mesh or other perforated panels may be used in the construction of a lures having forms which generate diving or side-to-side wobbling action, such as symmetrical shells having lips, fins, rudders and/or other features which impart motion to the lure. Also, in some embodiments only selected portions of one or more of the surfaces may be provided with the mesh or other perforations.

Still further an auxiliary attractor device such as a hollow spinner blade or colored orb may be constructed using the perforated panels of the present invention. Moreover, in some embodiments a light source, noise source or scent source may be incorporated into the lure for enhanced attractive effect. Such items may be enclosed permanently or temporarily within the shell, so that the light, noise or scent which is generated thereby passes outwardly into the water through the perforations in the lure. Still further, a secondary device such as a spinner blade or a natural bait may be attached or mounted adjacent to the body of the lure.

It is therefore to be recognized that these and various other alterations, modifications and/or additions may be introduced into the constructions and arrangements of parts described above without departing from the spirit and scope of the present invention.

What is claimed is:

1. A fishing lure, comprising:
    an elongate body having forward and rearward ends and a predetermined curvature for imparting rolling motion to said lure in response to passage through water, said elongate body comprising:
        first, second and third substantially crescentiform panels, each said crescentiform panel having a generally convex edge and a generally concave edge;
        said convex edge of said third panel being joined to said convex edge of said first panel, said concave edge of said first panel being joined to said convex edge of said second panel, and said concave edge of said second panel being joined to said concave edge of said third panel;
        so that said crescentiform panels form said predetermined curvature which imparts said motion to said body of said lure.

2. The lure of claim 1, wherein at least one of said panels comprises:
    a multiplicity of perforations formed in said panel so as to establish fluid communication between an interior of said body of said lure and surrounding water.

3. The lure of claim 1, wherein said plurality of panels are formed with contrasting colored and/or reflective surfaces for generating a flickering visual pattern in response to said motion of said lure.

4. A fishing lure, comprising:
    an elongate, generally hollow body having forward and rearward ends and a predetermined curvature for imparting a rolling motion to said lure in response to passage through water, said elongate body comprising:
    first, second and third generally crescentiform panels, each said crescentiform panel having a generally convex edge and a generally concave edge;
    said convex edge of said third panel being joined to said convex edge of said first panel, said concave edge of said first panel being joined to said convex edge of said second panel, and said concave edge of said second panel being joined to said concave edge of said third panel, so that said crescentiform panels form said predetermined curvature which imparts said rolling motion to said body of said lure;
    at least one of said crescentiform panels comprising:
        a mesh portion having a multiplicity of perforations formed therein for establishing fluid communication between said hollow interior of said body and surrounding water;
        so that in response to said lure being drawn through said water, said rolling motion forces water to pass into and through said perforations so as to generate turbulence and vibrations which attract game fish to said lure.

5. A fishing lure, comprising:
    a plurality of discrete panels joined in edge-to-edge relationship so as to define an elongate three-dimensional lure body having a hollow interior, and forward and rearward ends, said plurality of panels comprising:
        first, second and third substantially crescentiform panels, each said crescentiform panel having a generally convex edge and a generally concave edge;
        said convex edge of said third panel being joined to said convex edge of said first panel, said concave edge of said first panel being joined to said convex edge of said second panel, and said concave edge of said second panel being joined to said concave edge of said third panel;
        so that said crescentiform panels form a portion of said lure body having a curvature for imparting a rotating motion to said body in response to said lure being drawn through surrounding water; and
    a plurality of perforations formed in at least one of said panels for establishing fluid communication between an interior of said body and said surrounding water, so that said rotating motion forces water to pass through said perforations so as to generate turbulence and vibrations which attract game fish to said lure.

6. The lure of claim 5, further comprising:
    a leader attachment point formed on said body of said lure, said leader attachment point being located at a spaced distance from said forward end of said body.

7. The lure of claim 5, wherein said leader attachment comprises:
    an opening formed in a selected one of said panels so as to permit a leader to be threaded through said interior of said body to said rearward end thereof.

8. The lure of claim 7, further comprising:
    means for attaching a hook at said rearward end of said body.

9. The lure of claim 7, wherein said means for attaching a hook at said rearward end of said body comprises:
    an exit opening formed at said rearward end of said body for outward passage of said leader therethrough.

10. The lure of claim 9, wherein said exit opening at said rearward end of said body comprises:
    a receptacle portion for receiving a barrel swivel which is attached to said leader therein, so as to hold said barrel swivel in predetermined alignment with said body of said lure.

11. The lure of claim 5, wherein said panels are formed as a unitary structure which forms said body of said lure.

12. The lure of claim 5, wherein said panels are formed as at least first and second separate structures which are mounted together so as to form said body of said lure.

* * * * *